United States Patent [19]
Polkhovskiy

[11] Patent Number: 6,108,923
[45] Date of Patent: Aug. 29, 2000

[54] NOZZLE ASSEMBLY SETTING GAUGE

[76] Inventor: Nikolay Polkhovskiy, 17 Mohawk St., Whitesboro, N.Y. 13492

[21] Appl. No.: 09/130,673

[22] Filed: Aug. 6, 1998

Related U.S. Application Data

[60] Provisional application No. 60/055,041, Aug. 8, 1997.

[51] Int. Cl.[7] ..................... G01B 5/14
[52] U.S. Cl. .............. 33/501.45; 33/833; 33/502; 33/613; 33/652
[58] Field of Search ............... 33/712, 832, 833, 33/502, 501.45, 533, 613, 645, 652

[56] References Cited

U.S. PATENT DOCUMENTS

| | | | |
|---|---|---|---|
| 2,896,334 | 7/1959 | Dunderman | 33/652 |
| 4,714,200 | 12/1987 | Sayama | 239/579 |
| 4,960,407 | 10/1990 | Cope | 604/300 |

FOREIGN PATENT DOCUMENTS

| | | |
|---|---|---|
| 59-139955 | 8/1984 | Japan . |
| 1-284351 | 11/1989 | Japan . |

OTHER PUBLICATIONS

Multiprpose Gauge, R.W. Beckett Corporation, Form 61220R197, no date.

*Primary Examiner*—Andrew H. Hirshfeld
*Attorney, Agent, or Firm*—David M. Giglio

[57] ABSTRACT

A nozzle assembly setting gauge for use in an oil burner to gauge the optimal operating distance between a combustion head and a nozzle. The nozzle assembly setting gauge includes a holder for engaging the nozzle assembly and a head having a cross sectional thickness which defines the optimal operating distance. A technician installs the nozzle assembly setting gauge onto the nozzle assembly and fully inserts the nozzle assembly into oil burner until a front face of the nozzle assembly setting gauge contacts the combustion head. Next, the technician indicates the position of the nozzle assembly at this fully inserted position. The technician removes the nozzle assembly setting gauge and re-inserts the nozzle assembly to the indicated position.

8 Claims, 2 Drawing Sheets

NOZZLE ASSEMBLY SETTING GAUGE

This application is a Provision of Ser. No. 60/055,041, filed Aug. 8, 1997.

FIELD OF INVENTION

This invention relates to setting gauges that are used for adjusting nozzles in relationship to the combustion head in oil burners (particularly in oil burners with the combustion head attached to the blast tube).

BACKGROUND OF THE INVENTION

Currently this type of burners constitutes the greatest market share for residential oil heating systems. The examples of such burners are well known Beckett AF, AFG, SR, and SF burners—products of R.W. Beckett Corporation. For optimum efficiency the nozzle must be positioned at a certain distance from the combustion head (specification is in the oil burner manual). In addition, if the nozzle position is wrong then several major problems could arise such as, carbon buildup on the combustion head or no spark due to shorted electrodes on the combustion head. These problems cause malfunctioning of the burner and a technician is called upon to fix the burner. The proper nozzle position is achieved by setting the nozzle assembly (drawer assembly) with the escutcheon plate screw located on the burner housing.

The newly invented gauge has been manufactured for and distributed by the Inventor since Spring, 1998 under the name—NASgauge™.

To see why technicians need the NASgauge (Nozzle Assembly Setting Gauge), let us take a look at the problems that they occasionally encounter during service calls and clean-ups:

1. The nozzle assembly or nozzle adapter is changed
2. The nozzle assembly was moved due to loose escutcheon plate screw
3. Carbon build-up is found on the combustion head
4. Delayed or no ignition occurs that could be a result of shorted electrodes on the combustion head
5. The homeowner is suspected of tampering with the burner Dealing with the first two problems, adjustment of the nozzle assembly is required. To solve the rest of the above listed problems checking of the nozzle position in relationship to the combustion head or the adjustment of the nozzle assembly is necessary because there is no way to know if the nozzle assembly was set properly to begin with.

To avoid callbacks, technicians spend up to a half-hour making the necessary checking and/or adjustments using gauges provided by burner manufacturers (an example: Beckett multipurpose gauge, part T-500). With such gauges on the market the burner must be removed from the appliance in order to set the nozzle assembly. Such gauge is applied by a technician to the front part of the combustion head and necessary adjustments are made. However, to do this is not so simple because the burner must be removed from the appliance. To remove the burner a technician has to dismantle components that have no bearing on the nozzle assembly. Rusty studs securing the burner and a broken flange gasket hamper the dismantling process. Assembling the unit can also be complicated by oil line fittings (compression type) that don't go back together quite as well and then leak. Since traditional methods of making these adjustments is time consuming, technicians sometimes set the nozzle assembly by guess. Such adjustment sometimes provide a fix but often create a problem so that a technician is called upon to set the correct nozzle position.

OBJECT AND ADVANTAGES OF NEW INVENTION

The object of the present invention is to enable technicians to set the nozzle at the proper distance from the combustion head WITHOUT REMOVAL OF THE BURNER FROM THE APPLIANCE. This is achieved by adjusting the nozzle assembly while gauging the distance between the nozzle and the back of the combustion head with the NASgauge placed over the nozzle. It takes only 15–20 seconds to set the nozzle assembly with the NASgauge. No more guess work, no more blind adjustment, no more burner removals.

DETAILED DESCRIPTION OF THE INVENTION

Figure 1:
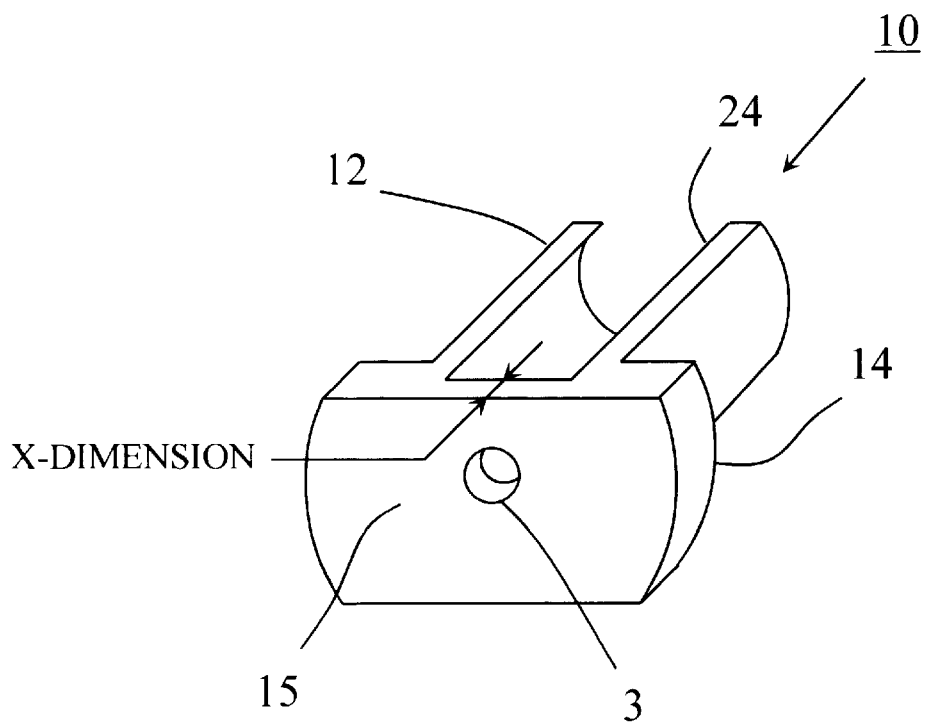
FIG. 1 shows the NASgauge in oblique view.
Figure 2:
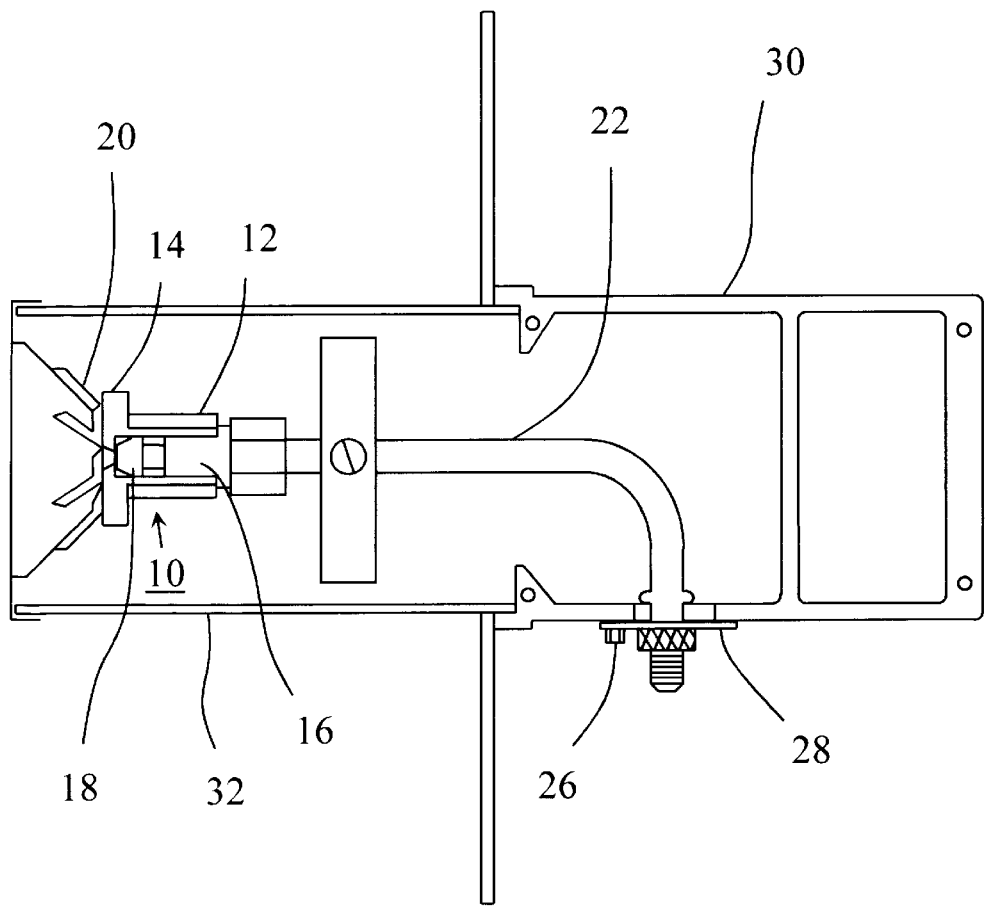
FIG. 2 shows the NASgauge installed on the nozzle while the nozzle assembly is located in the burner.

The nozzle assembly setting gauge is designed as a solid cast in oil resistant plastic. Conceptually, and referring to FIG. 1, the nozzle assembly setting gauge 10 contains two parts: a holder 12 and a head 14. Referring to FIG. 2, the holder 12 fits snugly over a nozzle adapter 16 while the head 14 fits in the space between a nozzle 18 and a combustion head 20. The distance between the nozzle 18 and the combustion head 20 may differ depending upon the burner specifications; therefore specific gauges will have to be made to accommodate this issue (particularly the x-dimension can be different, FIG. 1). For example, this dimension in nozzle assembly setting gauges for previously mentioned Beckett burners is ⅛ inch. An opening 3 in the center of the head 14 is designed to allow oil to pass through in case the technician forgets to remove the nozzle assembly setting gauge 10 during the set up process.

To set a nozzle assembly 22 using the nozzle assembly setting gauge 10, the nozzle assembly 22 is removed from an oil burner housing 30. The technician checks the operating condition of the combustion head 20, ensuring that the combustion head 20 is not damaged and free of carbon. The technician slides the nozzle assembly setting gauge 10 over both the nozzle 18 and the nozzle adapter 16. The holder 12 of the nozzle assembly setting gauge 10 includes a slotted portion 24 which is faced toward the top of the nozzle assembly 22 during the setting operation. Next, the technician slightly loosens a screw 26 which holds an escutcheon plate 28, and slides the escutcheon plate 28 backward.

The technician places the nozzle assembly 22 back into the oil burner housing 30, holds the nozzle assembly 22 tight to the left side of the burner, and moves the nozzle assembly 22 forward until a front face 15 of the head 14 of the nozzle assembly setting gauge 10 contacts the back of the combustion head 20. At this point, the escutcheon plate location is marked on the oil burner housing 30. The technician then pulls the nozzle assembly 22 out of the oil burner housing 30 and removes the nozzle assembly setting gauge 10. Next, the nozzle assembly 22 is inserted back into the oil burner housing 30. The technician then positions the escutcheon plate 28 to the previously marked location on the oil burner housing 30, and tightens the escutcheon plate 28 to the oil burner housing 30 to complete the setting operation.

The nozzle assembly setting gauge (NASgauge) 10 of the present invention is designed for use on oil burners with the combustion head 20 attached to a blast tube 32. The nozzle assembly setting gauge 10 makes it possible to set the nozzle assembly 22 and nozzle 18 in proper relationship to the combustion head 20 without removing the oil burner from the heating system. Using the nozzle assembly setting gauge 10 of the present invention allows technicians to save time and increase their level of service.

Although the description above contains some specifications, these should not be construed as limiting the scope of the invention but as merely providing illustration of the presently preferred embodiment of this invention. The nozzle assembly setting gauge 10 can have other shapes and dimensions than those previously described and shown. The nozzle assembly setting gauge 10 can be mounted to the nozzle adapter 16 and/or nozzle 18 with a different type of mounting connection. The nozzle assembly setting gauge 10 can be metal or some other type of material. Finally, the nozzle assembly setting gauge 10 can be adjustable and made to meet the specifications of different burners.

Thus the scope of this invention should be determined by the claims and their equivalents, rather than by the example given.

What is claimed is:

1. A combination of an oil burner and a gauging apparatus, said oil burner comprising a housing, a blast tube connected to said housing, a combustion head disposed within said blast tube, a nozzle assembly disposed within said housing and said blast tube, said nozzle assembly including a nozzle, said nozzle being an optimal operating distance from said combustion head, said gauging apparatus for gauging said optimal operating distance between said nozzle and said combustion head, said apparatus comprising:

holding means for securely engaging said nozzle assembly; and a gauge head having a front face and at least one cross sectional thickness, said front face including a geometry which allows said front face to contact said combustion head when said holding means is engaged upon said nozzle assembly and said nozzle assembly is inserted in said oil burner so that said nozzle is said optimal operating distance from said combustion head, and wherein said at least one cross sectional thickness defines the optimal operating distance between said combustion head and said nozzle.

2. The combination of claim 1, wherein said apparatus is solid cast from an oil resistant plastic.

3. The combination of claim 1, wherein said gauge head includes an opening which allows oil to be ejected therethrough from said nozzle.

4. The combination of claim 1, wherein said holding means further includes at least one slotted portion.

5. A method for positioning a nozzle in an oil burner, said oil burner including a combustion head and a nozzle assembly, wherein said nozzle further includes said nozzle, said method comprising:

removing said nozzle assembly from said oil burner;

installing a gauging apparatus on said nozzle assembly, wherein said gauging apparatus includes a holder securely engaging said nozzle assembly and a head having a front face and at least one cross sectional thickness defining an optimal distance between said nozzle and said combustion head; and positioning said nozzle assembly into said oil burner until said front face of said gauging apparatus engages said combustion head, said positioning being at a fully inserted position.

6. The method of claim 5, further including the steps of:

indicating the fully inserted position of said nozzle assembly;

removing said nozzle assembly a second time from said oil burner;

removing said gauging apparatus; and re-inserting said nozzle assembly to the indicated position.

7. The method of claim 6, further including the step of tightening said nozzle assembly at the indicated position.

8. The method of claim 5, further including the step of tightening said nozzle assembly at the fully inserted position.

* * * * *